United States Patent
Chess et al.

(10) Patent No.: US 7,207,065 B2
(45) Date of Patent: Apr. 17, 2007

(54) APPARATUS AND METHOD FOR DEVELOPING SECURE SOFTWARE

(75) Inventors: Brian Chess, Mountain View, CA (US); Arthur Do, Danville, CA (US); Sean Fay, San Francisco, CA (US); Roger Thornton, San Jose, CA (US)

(73) Assignee: Fortify Software, Inc., Menlo Park, CA (US)

( * ) Notice: Subject to any disclaimer, the term of this patent is extended or adjusted under 35 U.S.C. 154(b) by 0 days.

(21) Appl. No.: 11/010,146

(22) Filed: Dec. 10, 2004

(65) Prior Publication Data

US 2005/0273854 A1    Dec. 8, 2005

Related U.S. Application Data

(60) Provisional application No. 60/577,066, filed on Jun. 4, 2004.

(51) Int. Cl.
*G06F 11/00* (2006.01)
*H04L 9/32* (2006.01)

(52) U.S. Cl. .................. 726/25; 726/3; 726/22
(58) Field of Classification Search .......... 726/22, 726/25
See application file for complete search history.

(56) References Cited

U.S. PATENT DOCUMENTS

| | | | |
|---|---|---|---|
| 5,440,723 A | 8/1995 | Arnold et al. | |
| 5,502,815 A | 3/1996 | Cozza | |
| 2001/0027383 A1 | 10/2001 | Maliszewski | |
| 2002/0066024 A1 | 5/2002 | Schmall et al. | |
| 2002/0073330 A1 | 6/2002 | Chandnani et al. | |
| 2003/0120951 A1 | 6/2003 | Gartside et al. | |
| 2003/0159063 A1* | 8/2003 | Apfelbaum et al. | 713/200 |
| 2004/0133777 A1* | 7/2004 | Kiriansky et al. | 713/166 |
| 2004/0255163 A1* | 12/2004 | Swimmer et al. | 713/201 |
| 2004/0255277 A1 | 12/2004 | Berg et al. | |
| 2004/0260940 A1 | 12/2004 | Berg et al. | |
| 2004/0268322 A1 | 12/2004 | Chow et al. | |
| 2005/0010806 A1 | 1/2005 | Berg et al. | |
| 2005/0015752 A1 | 1/2005 | Alpern et al. | |
| 2005/0028002 A1 | 2/2005 | Christodorescu et al. | |
| 2005/0273860 A1* | 12/2005 | Chess et al. | 726/25 |

OTHER PUBLICATIONS http://java.sun.com/docs/books/jls/second_edition/html/expressions.doc.html#20448 "Publication date unknown, but prior to Dec. 10, 2004."
http://java.sun.com/products/ejb/docs.html "Publication date unknown, but prior to Dec. 10, 2004."
http://java.sun.com/products/jdbc/reference/index.html "Publication date unknown, but prior to Dec. 10, 2004."
http://java.sun.com/j2se/1.4.2/docs/api/java/lang/reflect/package-summary.html "Publication date unknown, but prior to Dec. 10, 2004."
http://java.sun.com/j2se/1.4.2/docs/api/java/rmi/package-summary.html "Publication date unknown, but prior to Dec. 10, 2004."

* cited by examiner

*Primary Examiner*—Kambiz Zand
(74) *Attorney, Agent, or Firm*—Cooley Godward Kronish LLP

(57) ABSTRACT

A computer readable medium includes executable instructions to analyze program instructions for security vulnerabilities. The executable instructions convert diverse program instruction formats to a common format. A system model is derived from the common format. A static analysis is performed on the system model to identify security vulnerabilities. Security vulnerabilities are then reported.

20 Claims, 7 Drawing Sheets

APPARATUS AND METHOD FOR DEVELOPING SECURE SOFTWARE

This application claims priority to the U.S. Provisional Patent Application entitled "Apparatus and Method for Developing, Testing and Monitoring Secure Software", Ser. No. 60/577,066, filed Jun. 4, 2004. This application is related to the following commonly owned and concurrently filed patent applications: "Apparatus and Method for Developing, Testing and Monitoring Secure Software", U.S. Ser. No. 11/009,570, filed Dec. 10, 2004; "Apparatus and Method for Testing Secure Software", U.S. Ser. No. 11/009,474, filed Dec. 10, 2004; "Apparatus and Method for Monitoring Secure Software", U.S. Ser. No. 11/009,572, filed Dec. 10, 2004.

BRIEF DESCRIPTION OF THE INVENTION

This invention relates generally to software security. More particularly, this invention relates to comprehensive techniques for identifying software security vulnerabilities during software development, testing and deployment.

BACKGROUND OF THE INVENTION

Businesses are increasingly dependent on information technology. Information systems are becoming increasingly more complex, higher-powered, inter-connected, and openly accessible to partners and customers over vastly distributed networks. The business environment has increasingly shifted from face-to-face interactions to largely anonymous electronic transactions. Software development itself is becoming more distributed through offshore development arrangements and intra-company collaborative computing. These trends strain the ability of organizations to secure and protect digital data from misuse or unauthorized access.

Nearly every major business critical application deployed today contains vulnerabilities that can be exploited to cause considerable harm to the business or the assets it manages. These vulnerabilities can be leveraged to steal important information, sabotage computer systems or influence processing for the profit or malicious intent of the attacker.

For an experienced hacker or rouge insider, manipulating software to this end is made especially easy due to the variety of information and tools available on-line. An attacker's biggest challenge is simply finding the vulnerabilities in the context of a large business application. Compounding the problem, mainstream computer security solutions, such as firewalls, are based on the premise that exposed and vulnerable software can be protected by isolating it from the dangers of the outside world. Business requirements dictate that few business critical applications can be truly isolated. Most have numerous access points via data transfer interfaces, remote procedure calls, and internal and remote users. Firewalls and other network-oriented security solutions are not configured to block the type of access that business critical applications require. In fact, today's business functions rely on this access so much that they would fail to operate if denied. For example, the stock market would fail to execute trades without the links from brokers to the exchanges, supply chains would break without information flowing between suppliers and producers, and telecommunications would cease without the ability to connect cell phones to the computers that control the network or the billing systems that underlie the business. Attackers make use of these facts to compromise systems every day. The true flaw in the outside-in premise, however, is that vulnerable software can be protected at all—somehow made un-vulnerable.

Given this background, a question naturally presents itself: Why are network-based computer security solutions applied to what is clearly a software problem? One answer is that most information security practitioners have network security backgrounds and are spread thin resolving operational security issues, leaving little time to interact with the core software development process. At the same time, application developers are rewarded for producing new features against tight deadlines, with little room for security considerations. Rarely does any one person own responsibility for the security elements of the application itself. Conventional practice has been that development gets the business critical application shipped, and network operation teams will secure it. The dichotomy of these roles creates an extraordinary advantage for the attacker—they are the only ones truly experienced and focused on software security or more precisely business critical application insecurity.

Experts in and around software development have increasingly acknowledged that something must be done about software security. Nevertheless, coherent and practical solutions have not been identified. There are a number of factors that make solutions difficult to identify. For example, software security vulnerabilities are subtle, logical errors that can span thousands of lines of code, making accurate detection with reasonable performance extremely difficult. At first glance, the technology challenges make such a solution appear more akin to compilers or niche development tools. The large software development tools vendors, however, have not made security a core part of their offerings. Their customer base is still largely focused on how to improve creation of features and functionality—and the vendors' internal teams cannot easily recognize a changing paradigm while they work to improve the feature sets of their single-purpose products. This is a classic innovators dilemma. In addition, the high volume development tool providers are not adept at delivering enterprise-like solutions that a risk management system requires or sustaining the price points needed to support such a solution. Indeed, the current state of development tool pricing has generally discouraged the security community from building developer-oriented solutions.

Apart from the downsides inherent in the development tool landscape, software security requires specialized expertise in a constantly changing field. The problem is not just about finding technology to scan code, but includes creating and continually updating rules to detect these vulnerabilities. Delivering the rules requires expert knowledge of a constantly growing body of research and real-world architectures, frameworks, use patterns and many other factors that cause vulnerabilities in business critical applications. For example, every release of an operating system or library application program interfaces (APIs) introduces new ways to make mistakes that lead to security vulnerabilities. Vendors must deliver solutions that account for these cross-boundary, multi-platform architectures.

Finally, it is unlikely that software security can be accomplished by a single point solution. Similarly, it is unlikely that software security can be addressed solely at the developer level. Software security is largely a risk management problem. Addressing such a problem requires detailed information collected over time. It requires an approach that keeps software developers as productive as before, yet makes security metrics visible to management during development, testing and deployment. It requires an enterprise software-like solution for managers and organizations.

In view of the foregoing, it would be highly desirable to provide an improved technique for software security.

SUMMARY OF THE INVENTION

The invention includes a computer readable medium with executable instructions to analyze program instructions for security vulnerabilities. The executable instructions convert diverse program instruction formats to a common format. A system model is derived from the common format. A static analysis is performed on the system model to identify security vulnerabilities. Security vulnerabilities are then reported.

The invention also includes a method of analyzing program instructions for security vulnerabilities. Diverse program instruction formats are converted to a common format. A system model is derived from the common format. A static analysis is performed on the system model to identify security vulnerabilities. Security vulnerabilities are then reported.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
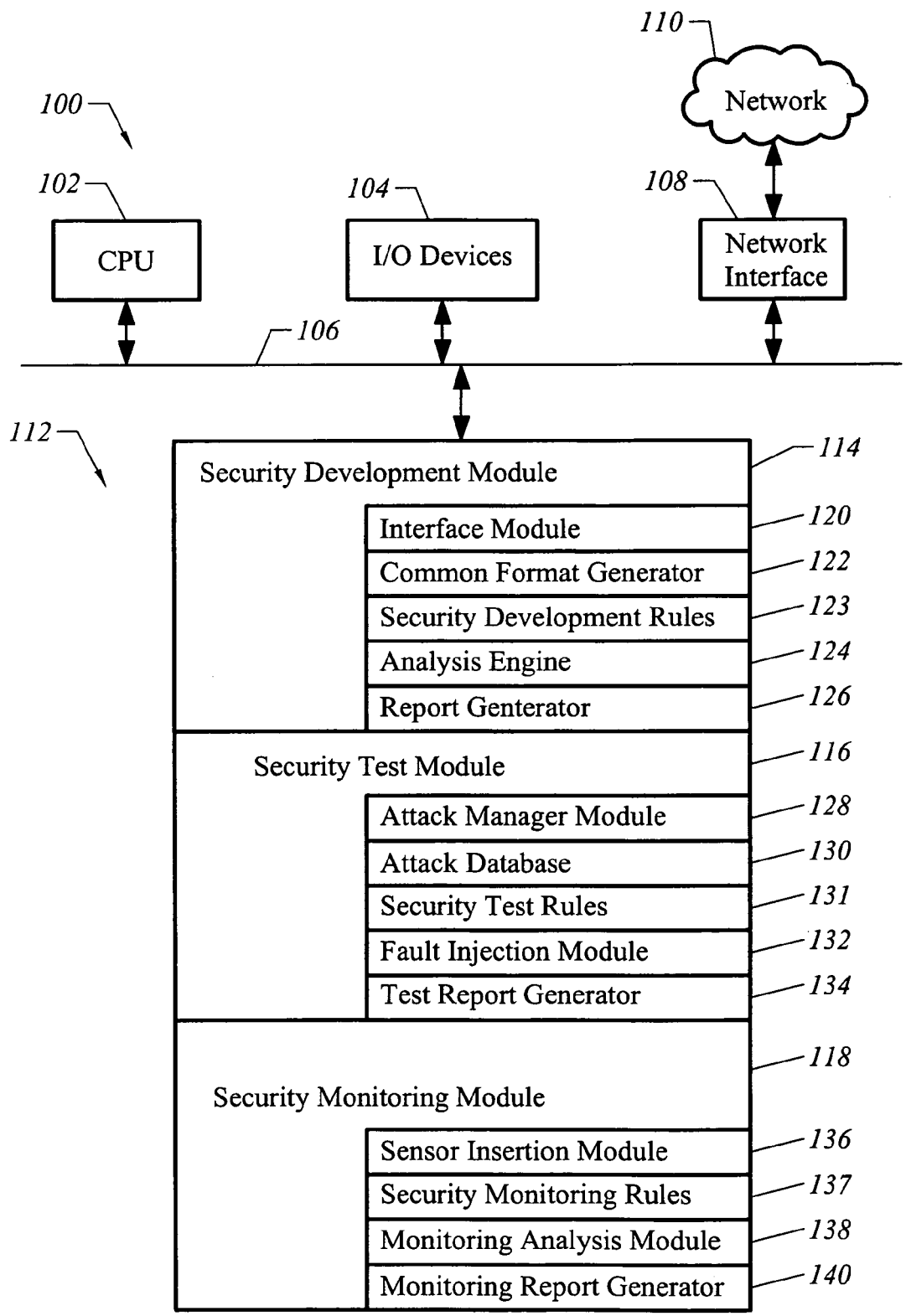
FIG. 1 illustrates an apparatus configured in accordance with an embodiment of the invention.

FIG. 1 illustrates an apparatus 100 configured in accordance with an embodiment of the invention. The apparatus 100 includes a central processing unit 102 connected to a set of input and output devices 104 over a bus 106. By way of example, the input and output devices may include a keyboard, mouse, computer monitor, printer, and the like. Also connected to the bus 106 is a network interface 108, which uses standard devices to interface with a network 110, which may be a local area network, an intranet, the Internet, and the like.

A memory 112 is also connected to the bus 106. The memory 112 stores a set of executable instructions to implement the operations of the invention. In one embodiment, the executable instructions include three major modules: a security development module 114, a security test module 116, and a security monitoring module 118.

The security development module 114 includes executable instructions to facilitate a static analysis of software in order to identify security vulnerabilities inherent to the structure of the software. The software includes program instructions. As discussed below, the invention is operative with diverse program instruction formats. For example, the program instruction formats may be different source or executable code formats, different machine instruction formats, and/or different program configuration file formats. The program instructions form various software applications. A set of software applications define a software system, which is analyzed in accordance with the invention, as discussed below. In one embodiment, the security development module 114 is implemented with an interface module 120, a common format generator 122, security development rules 123, an analysis engine 124, and a report generator 126.

The security test module 116 includes executable instructions to test the operation of software for security vulnerabilities. Preferably, the security test module 116 relies upon information gathered by the security development module 114 to refine its testing protocol. In one embodiment, the security test module 116 is implemented with an attack manager module 128, an attack database 130, security test rules 131, a fault injection module 132, and a test report generator 134.

The security monitoring module 118 includes executable instructions to monitor the execution of software in order to identify security vulnerabilities. Preferably, the security monitoring module 118 relies upon information associated with the local execution of a program and the global execution of related programs to identify security vulnerabilities. In one embodiment, the security monitoring module 118 is implemented with a sensor insertion module 136, security monitoring rules 137, a monitoring analysis module 138, and a monitoring report generator 140.

The configuration of the executable programs of FIG. 1 is exemplary. It should be appreciated that these modules may be combined in any manner and may otherwise be executed in any manner, such as across a network. Indeed, in many embodiments of the invention, these components are distributed across a network. Further, the operations performed by individual sub-modules may be combined in any number of ways.

Now that the primary processing operations of the invention have been introduced, attention turns to a more detailed discussion of these primary processing operations. As shown in FIG. 1, the security development module 114 includes an interface module 120. The interface module 120 includes executable code to handle interface operations. For example, the interface module handles interactions with the user via command lines, pull-down menus, IDE plug-ins and the like. The interface module also interacts with the other executable programs of the system, including the security test module 116 and the security monitoring module 118.

Figure 2:
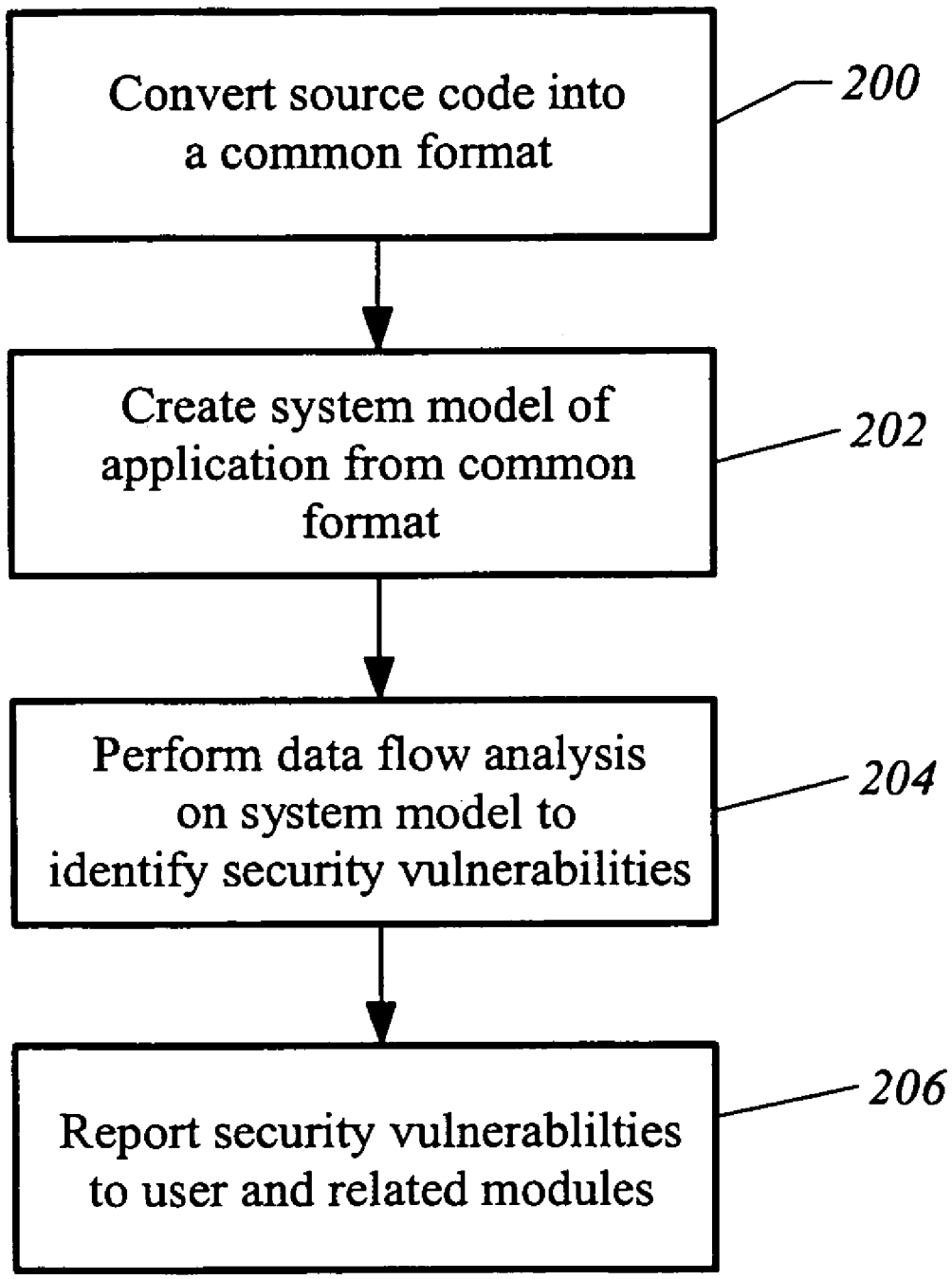
FIG. 2 illustrates processing operations associated with an embodiment of a security development module of the invention.

FIG. 2 illustrates the primary processing operations associated with the other executable modules of the security development module 114. The first processing operation shown in FIG. 2 is to convert source or executable code into a common format 200. This operation may be implemented with the common format generator 122. The common format generator 122 converts all of the source or executable code files for all of the tiers of an application to be analyzed into a common format. The example common format disclosed herein is called the Normalized Syntax Tree (NST) format.

An application system model is then derived from the common format 202. The common format generator 122 may perform this operation as well. In particular, the executable code is used to create a uniform model of the application from the NST files.

A data flow analysis is then performed on the system model to identify security vulnerabilities 204. The analysis engine 124 may be used to implement this operation. The analysis engine 124 identifies possible execution paths through the program where user input can reach a dangerous function or construct. The analysis engine 124 invokes security development rules 123. Typically, the security development module 114 is deployed with a set of security development rules 123. These rules may be updated on a subscription basis from a remote computer connected to network 110. In addition to these supplied rules, a user may tailor specific security development rules for a particular application. The analysis engine 124 is a separate computational kernel and therefore it can be used with a diverse set of standard and customized security development rules 123.

The security vulnerabilities identified by the analysis engine 124 are reported to the user and related modules 206. The report generator 126 may be used to implement this operation.

The security development module 114 performs a form of semantic analysis across multiple tiers and languages to find security vulnerabilities, such as stack buffers, tainted variables, SQL injection and custom-defined security flaws. The tiers range from the operating system to the database, application server to user interface, in applications that span multiple languages, including Java, C/C++, HTML, JSP and PL/SQL. The invention's analysis of diverse program instruction formats and systems that include multiple software applications is a significant advance over prior art systems.

The security development module 114 of the invention may be integrated into commercially available integrated development environments, thus investigating warnings and removing security errors becomes a natural part of the edit-compile-debug software development process.

As shown in FIG. 1, the security development module 114 may be implemented with an analysis engine 124. The analysis engine 124 preferably implements a static analysis. Static analysis is a technique for analyzing software without executing the software. Static analysis has historically suffered from high complexity. In particular, static analysis has gained a reputation for producing a high volume of suspect or hard to interpret results when applied to real world software.

There are a number of challenges associated with using static analysis in software security operations. First, both global dataflow and control flow static analysis techniques must be used to provide accuracy. Second, the myriad languages and frameworks create special cases that must be handled. Third, security analysis must be extensible to cover the large set of application-specific vulnerabilities. Fourth, security analysis requires the study of attacks to define the semantic representation of particular vulnerability classes and the studies must be kept up-to-date since these attacks change over time. Finally, any analysis must be constrained by realistic commercial product requirements. The two most difficult requirements to satisfy in a commercial setting are scalability and code access. With respect to scalability, the analysis must perform with extremely low overhead at the developer's desktop, yet perform well in a full-scale audit and review over massive code bases. In addition, the global analysis must often be facilitated without access to the entire body of code.

The present invention addresses these challenges that exist in the prior art. The security development module 114 provides a new form of static analysis that is directed solely to software security issues. The security development module 114 provides useful information that can be immediately utilized to improve software security. In addition, it provides useful information that is exploited during testing and monitoring phases.

These operations are more fully appreciated in connection with an example. The following example illustrates the steps carried out by the security development module for a simple 2-tier application. The following example is complete in that it provides sufficient input to identify code vulnerabilities. The example is incomplete in the sense that additional standard tools, support logic, and configuration files are required to actually run the application. These additional elements are standard in the art and therefore are not subject to further discussion.

The sample application consists of a Java servlet and a PL/SQL package. The purpose of the application is to display an account balance to a user. The application works as follows. The Java servlet accepts an HTTP POST request that contains a parameter named "acct". This is the type of HTTP request typically generated by a web browser when a user fills out and submits a form on a web page. The "acct" parameter might be set, for example, by the user selecting an account name from a drop-down list. The servlet passes the value of the "acct" parameter to a database query. The query invokes a stored procedure in the database named "ACCT.get_balance". The stored procedure uses the parameter passed from the servlet in order to construct an SQL query. The query examines a database table named "ACCOUNTS". It returns the value in the "balance" column for the row matching the account name that is passed in. The stored procedure returns the balance value to the servlet, and the servlet in turn returns the balance value to the user.

A malicious user can exploit vulnerability in the application in order to see account balances that they are not authorized to see. The vulnerability is simple: the application never checks to see whether the user has permission to see the balance of the account number that they have requested. This type of vulnerability is common in poorly written web-based applications. The problem can be viewed in terms of data flow: the "acct" value provided by the user flows unchecked into the SQL query in the database. This class of vulnerabilities is known as "SQL injection" because a malicious user can "inject" information of their choosing into a SQL query.

The following is exemplary Java code for an account balance application:

```
********************************************************
import java.sql.*;
import javax.servlet.http.*;
class AccountView extends HttpServlet {
    private Connection connection;
    public void doPost(HttpServletRequest request,
                       HttpServletResponse response) {
        String acctNumber = request.getParameter("acct");
        CallableStatement stmt = null;
        try {
            stmt =
            connection.prepareCall("begin ACCT.get_balance(?, ?); end;");
```

-continued

```
    // Bind parameter types
    stmt.setString(1, acctNumber); // Bind 1st parameter
    stmt.registerOutParameter(2, Types.INTEGER); // 2nd is result
    // Execute the callable statement
    stmt.execute( );
    int balance = stmt.getInt(2); // get result
    response.getWriter( ).write("Account balance: " + balance);
  } catch(SQLException ex) { // Trap SQL Errors
    response.getWriter( ).write("Error: " + ex.toString( ));
  } finally {
    try {
      if(stmt != null) {
        stmt.close( ); // close the statement
      }
    } catch(SQLException ex) {
    }
  }
 }
}
****************************************************************
```

Relying upon the same example, the following is PL/SQL code for the Account Balance application:

```
****************************************************************
    CREATE OR REPLACE PACKAGE ACCOUNT IS
      TYPE CURSORTYPE IS REF CURSOR;
      FUNCTION get_balance(
        NAME VARCHAR2
      )
        RETURN CURSORTYPE;
    END;
    /
    -- Package body TEST
    CREATE OR REPLACE PACKAGE BODY TEST IS
      FUNCTION get_balance(
        NAME VARCHAR2
      ) RETURN CURSORTYPE IS
      CURSORRET CURSORTYPE;
      N1 VARCHAR2;
      BEGIN
        N1:= NAME;
        OPEN CURSORRET FOR
          SELECT    balance
          FROM      ACCOUNTS
          WHERE     (ACT_NUMBER = N1);
          RETURN CURSORRET;
      END;
    END;
    /
    commit;
    show errors;
    exit;
****************************************************************
```

As previously indicated, the initial operation performed by the security development module is to convert all of the source or executable code files for all of the tiers of the application into a common format, called the Normalized Syntax Tree (NST) format.

This step involves parsing each source or executable code file according to the language it is written in and then translating the parsed information into the NST format. This step closely resembles the first phase carried out by a modern high-level language compiler (such as the Gnu C compiler, gcc) where the compiler creates a high-level intermediate language from a source or executable file. High-level languages are designed for balance between the freedom and expressiveness given to the programmer and rules and constraints necessary for a compiler to efficiently translate the language into an executable form. Humans do not write the NST format, so it does not supply the niceties and shortcuts that are usually provided for programmers. Because the NST format is created from a number of different high-level languages, it targets the lowest common denominator between the languages. Of course, it must provide enough expressiveness to capture the meaning of all of the constructs in all of the languages. Compiler researchers have defined well-accepted methods for building program models. For example, see chapters 3, 4, and 8 of Aho, et al., *Compilers, Principles, Techniques and Tools*, Pearson Higher Education (1985).

Translation from a high-level language into the NST format is governed by a set of translation rules that are specific to the high-level language being translated. For example, some of the rules controlling the translation from Java to NST are:

NST does not include a construct like Java's import statement. Java import statements have no explicit representation in the NST.

Java does not require programmers to fully qualify variable, class, and method names unless a name is potentially ambiguous. NST requires all names to be fully qualified so that there is no need to check for ambiguity. When a name is translated from Java to NST, it is translated into a fully qualified form. Type and method resolution in Java is achieved by following the rules and instructions set forth in the Java Language Specification (section 15.12, http://java.sun.com/docs/books/jls/second_edition/html/expressions.doc.html#20448).

In Java, all objects are referenced through pointers. Because there is only one way to reference an object, no pointer notation is necessary in Java. Because NST is used to represent languages like C and C++ where objects may be referenced directly or through pointers, all Java object references are translated to include explicit pointer reference notation in NST.

In Java, a member function can operate on its object using the keyword "this". NST has no "this" keyword. Instead, the object associated with a member function is explicitly represented as the first argument to the function.

The following text describes the NST syntax using grammar-like constructs. The following conventions are used:

```
Production - A plain word refers to another production
identifiers - A word in italics is an identifier
<token> - A word or character surrounded by brackets is a token
<token_class> - A word in italics surrounded by brackets refers to a class
  of tokens.
CompilationUnit:
(ClassDecl|VarDecl|FunDecl)*
ClassDecl:
<modifier>* name (ExtendsList)? (ImplementsList)? <{>
  (FieldDecl)*
  (FunDecl)*
<}>
ExtendsList:
<extends> (Type)+
ImplementsList:
<implements> (Type)+
FieldDecl :
<modifier>* Type name <;>
FunDecl :
<modifier>* Type name <(> ( ( VarDecl ( <,> VarDecl )*
  (<,> <...>)? ) | <...> )? <)> <:>
  unique_name ( Block | <;> )
VarDecl :
Type name <;>
```

```
Type :
(
  <modifier>* (<primitive_type>|typename) <*>*
(<[> numeric_literal? <]>)*
|<modifier>* (<primitive_type>|typename) <*>*
(<[> numeric_literal? <]>)* <(> ( VarDecl
( <,> VarDecl )* )? <)>
)
Statement :
( label <:> ) ?
(AssignmentStmt|IfElseStmt|WhileStmt|GotoStmt|DeclStmt|ReturnStmt|
CallStmt|Block) <;>
Block :
<{>
  (Statement)*
<}>
AssignmentStmt :
(Location) <=> Expression
DeclStmt :
VarDecl
IfElse :
<if> <(> Expression <)> Block
(<else> Block)?
WhileStmt :
<while> <(> Expression <)> Block
ReturnStmt :
<return> Expression
CallStmt :
FunCall
Expression :
(Location|FunCall|Allocation|OpExp|TypeCastExp|LiteralExp)
|<(> Expression <)>
Location :
(
  (VarAccess|FieldAccess) (Index)*
| FunIdentifier
)
FunCall :
(
  <->> unique_name
| <--> Expression
In this case expression is expected to evaluate to a function pointer
)
<(> Arg (<,> Arg)* <)>
GotoStmt :
<goto> label
Arg :
(Expression)
Allocation :
<new> Type (Index)*
VarAccess :
name
FieldAccess :
(<[> Type <]>)? (Expression) <.> name
note: Type here represents the enclosing type of the field being accessed
FunIdentifier :
<->> unique_name
Index :
<[> (Location|LiteralExp) <]>
OpExp :
((<unary_op> Expression)|(Expression <bin_op> Expression))
TypeCastExp :
<<>Type <>> Expression
LiteralExp :
<literal>
Directive : (A directive can appear on any line by itself)
<#> ( <source-type> | <source-file> | <source-line> )
        a. Terminals
modifier :
  :public:
  :private:
  :protected:
  :static:
  :final:
  :strictfp:
  :abstract:
  :transient:
  :volatile:
  :vitual:
  :inline:
  :extern:
  :const:
primitive_type :
  :int:
  :long:
  :float:
  :double:
  :boolean:
  :short:
  :byte:
  :char:
  :void:
  :short char:
  :unsigned char:
  :unsigned short:
  :unsigned int:
  :unsigned long:
  :long long:
  :unsigned long long:
  :long double:
```

The NST is designed to represent programs for the purpose of global analysis. It is not designed to be compiled or to have a convenient, human-readable form. As such it does not support many convenient features of the languages (e.g., C, C++, Java) it represents. Features such as single statement declaration and initialization, assignments in expressions, short-circuit operators, typedefs, etc., are not part of the NST. Rather, the front-end translator is responsible for breaking down these complex expressions into equivalent sequences of simpler statements during the conversion from the source or executable language to NST. The following table contains an exemplary listing of high-level language constructs and their equivalent translation in NST form. Note that many of these translations require the introduction of temporary variables into the NST.

TABLE 1

High-Level Construct NST Equivalents

| Language Feature | NST Equivalent |
| --- | --- |
| Initializers<br>int a = 10; | VarDecl + AssignmentStmt<br>int a;<br>a = 10; |
| compound expressions<br>a = b = 17; | simple expressions<br>a = 17;<br>b = 17; |
| C typedefs<br>typedef unsigned int mytpe;<br>mytype a; | types resolved<br>unsigned int a; |
| continue statements<br>while(b){<br>  if(c){<br>    continue;<br>  }<br>  ...<br>} | ControlStmt<br>while_loop:<br>while(b){<br>  if(c){<br>    goto while_loop;<br>  }<br>  ...<br>} |
| continue statements<br>while(b){<br>  if(c){<br>    break;<br>  }<br>  ...<br>} | ControlStmt<br>while(c){<br>  if(c){<br>    goto while_loop_end;<br>  }<br>  ...<br>}<br>while_loop_end: |
| compound predicates<br>if(test( )){<br>  ...<br>} | Statement + Predicate<br>tmp = test;<br>if(tmp){<br>  ...<br>} |

TABLE 1-continued

High-Level Construct NST Equivalents

| Language Feature | NST Equivalent |
|---|---|
| short-circuit and<br>if(exp1( ) && exp2( )){<br>...<br>} | nested ifs<br>t = exp1( );<br>if(t){<br>  t = exp2( );<br>  if(t){<br>    ...<br>  }<br>} |
| short-circuit or<br>if(exp1( ) \|\| exp2( )){<br>...<br>} | nested ifs<br>t = exp1( );<br>if(!t){<br>  t = exp2( );<br>}<br>if(t){<br>  ...<br>} |
| conditional expressions<br>a = b ? 7 : 3; | IfElseStmt<br>if(b){<br>  a = 7;<br>} else {<br>  a = 3;<br>} |
| for loops<br>for(int i = 0; i < 10; ++i){<br>...<br>} | WhileStmt<br>int i;<br>i = 0;<br>while(i < 10){<br>  ...<br>  ++i;<br>} |
| do ... while loops<br>do{<br>...<br>} while (a < 10); | WhileStmt<br>...<br>while(a < 10){<br>  ...<br>} |
| switch statements<br>swtich(a){<br>  case 'a':<br>    ...(1)<br>    break;<br>  case 'b':<br>    ...(2)<br>  case 'c':<br>    ...(3)<br>    break;<br>  default:<br>    ...(4)<br>} | IfElseStmts + ControlStmts<br>if(a == 'a'){<br>  ...(1)<br>} else {<br>  if(a == 'b'){<br>    ...(2)<br>    goto case_c;<br>  } else {<br>    if(a == 'c'){<br>      case_c:<br>      ...(3)<br>    } else {<br>      ...(4)<br>    }<br>  }<br>} |
| inner classes, anonymous inner classes<br>class A{<br>  ...(A)<br>  class B{<br>    ...(B)<br>  }<br>} | named normal classes<br>class A{<br>  ...(A)<br>}<br>class A$B{<br>  protected final A A$this;<br>  public A$B(A a){<br>    A$this = a;<br>  }<br>  ...(B)<br>} |

The following rules are used to resolve types, variables, fields and functions in the NST back to their corresponding declarations.

```
***************************************************************
    varDecl resolveVar(VarAccess v)
        Scope s = v.getScope( )
        while(s.getVarDecl(v.name) = null)
            s = s.getParentScope( )
        return s.getDecl(v.name)
    FieldDecl resolveField(FieldAccess f)
        return resolveType(f.type) .getFieldDecl(f.fieldName)
    FunDecl resolveFun(FunCall f)
        if(f.type != null)
            return resolveType(f.type) .getFunDecl(f.funSig)
        else
            return f.getScope( ) .getRootScope( ) .getFunDecl(f.funSig)
    TypeDecl resolveType(Type t)
        return globalScope.getTypeDecl(f.typeName)
***************************************************************
```

Using the foregoing high-level construct NST equivalents and rules, the examplary Java code for the account balance example is transformed into the following exemplary NST listing. Line numbers are used so that individual lines can be referred to in the following discussion.

```
***************************************************************
1   #source-file /home/sean/scratch/patent/AccountView.java
2   #source-type java
3   :class: AccountView :extends: javax.servlet.http.HttpServlet {
4   :private: java.sql.Connection * connection ;
5   :public: void doPost ( AccountView * this~ ,
    javax.servlet.http.HttpServletRequest * request ,
    javax.servlet.http.HttpServletResponse * response ) :
    AccountView___doPost__LAccountViewLjavax__servlet__http__
    HttpServletRequestLjavax__servlet__http__HttpServletResponse {
6   java.lang.String * acctNumber ;
7   acctNumber =
8   ->
    javax__servlet__ServletRequest___getParameter__Ljavax__
    servlet__ServletRequestLjava__lang__String ( request , "acct" ) ;
9   java.sql.CallableStatement * stmt ;
10  stmt = :null: ;
11  {
12  stmt = ->
    java__sql__Connection___prepareCall__Ljava__sql__
    ConnectionLjava__lang__String ( [ AccountView ] ( this~ ) .
    connection , "begin ACCT.
13  get_balance(?, ?); end;" ) ;
14  java__sql__PreparedStatement___setString__Ljava__sql__
    PreparedStatementILjava__lang__String ( stmt , 1 , acctNumber ) ;
15  java__sql__CallableStatement___registerOutParameter__Ljava__sql__
    CallableStatementII ( stmt , 2 , [ java.sql.Types ] INTEGER ) ;
16  java__sql__PreparedStatement___execute__Ljava__sql__
    PreparedStatement ( stmt ) ;
17  int balance ;
18  balance = ->
    java__sql__CallableStatement__getInt__Ljava__sql__
    callableStatementI ( stmt , 2 ) ;
19  java__io__PrintWriter___write__Ljava__io__PrintWriterLjava__lang__
    String ( ->javax__servlet__ServletResponse___getWriter__Ljavax__
    servlet__ServletResponse ( response ) , ( "Account balance: " +
    balance ) ) ;
20  }
21  return ;
22  }
23  :public: void init^ ( AccountView * this~ ) :
    AccountView___init^__LAccountView {
24  javax__servlet__http__HttpServlet___init^__Ljavax__servlet__http__
    HttpServlet ( this~ ) ;
25  return ;
26  }
27  :public: static void clinit^ ( ) : AccountView___clinit^__S__ {
28  return ;
29  }
30  }
***************************************************************
```

Similarly, using the same high-level construct NST equivalents and rules, the exemplary representation of PL/SQL code for the account balance application is transformed into the following exemplary NST representation.

```
*************************************************************
31  #source-file /home/sean/scratch/patent/account.sql
32  #source-type java
33  static CURSORTYPE * TEST.get_balance ( :sql:varchar2:
    NAME ) : TEST.get_balance
34  {
35  CURSORTYPE * CURSORRET ;
36  :sql:varchar2: N1 ;
37  N1 = NAME ;
38  SELECT ( ( ACT_NUMBER == N1 ) ) ;
39  return ;
40  }
41  :sql:varchar2: ACT_NUMBER ;
*************************************************************
```

A subset of the Java to NST transformations associated with this example will now be discussed. In the case of the Java statement "private Connection connection", which is at the fourth line of the account balance application example, a transformation results in an NST equivalent statement ":private: java.sql.Connection*connection", which is at line 4 above. Three rules are applied to achieve this translation. First, the Java keyword "private" has been translated to the NST keyword ":private:". Second, the type identifier "Connection" has been fully resolved, becoming "Java.sql.Connection". In Java this declaration does not require notation to specify that the variable is an object reference because all variables in Java that are not primitive types are object references. The third applied rule relates to the fact that in one embodiment of the invention, NST requires that references be made explicit, so a "*" is added after the type identifier.

Another example transformation is from the Java statement "int balance=stmt.getInt(2); // get result" to the NST statement "balance=->java_sql_CallableStatement_getInt_Ljava_sql_CallableStatementI (stmt ,2)". First note that the comment at the end of the line has been discarded. The java function call has been translated into NST call notation by adding a "->" to the beginning of the call. The function name has been fully resolved, so "getInt" becomes "java_sql_CallableStatement_getInt_Ljava_sql_CallableStatementI". Java's object notation has been translated into NST's explicit argument notation. The object name "stmt" has been moved to be the first argument passed to the function.

Another example relates to the final "END" statement of the PL/SQL code example for the account balance application. This statement is transformed into a "return;" instruction. The NST format requires all changes to control flow to be made explicit, so the end of a control flow path through a function must always conclude with a return statement.

Now that all of the source or executable files have a corresponding NST representation, the security development module can create a homogeneous model of the application by reading all of the NST files. The creation of a system model at this point is straightforward because of the common format. Thus, known system modeling techniques may be used. For example, a system call graph is generated by matching up function call sites with the definitions of the invoked functions. In addition to linking together call graph nodes based on rules of the source or executable language or format, knowledge of framework conventions, runtime invocation mechanisms, application protocols, Remote Procedure Call and other mechanisms for interprocedural program interaction are used to create a model of the system which bridges language and process-space gaps. In some cases this requires analysis not only of the program source or executable code but also runtime environment configuration. Various standards bodies govern these frameworks, interfaces, conventions, and protocols. By way of example, the following are important for Java:

EJB (see http://java.sun.com/products/ejb/docs.html)
JDBC (see http://java.sun.com/products/jdbc/reference/index.html)
Java Reflection (see java.lang.reflect API documentation: http://java.sun.com/j2se/1.4.2/docs/api/java/lang/reflect/package-summary.html)
RMI (see java.rmi API documentation: http://java.sun.com/j2se/1.4.2/docs/api/java/rmi/package-summary.html)

Figure 2A:
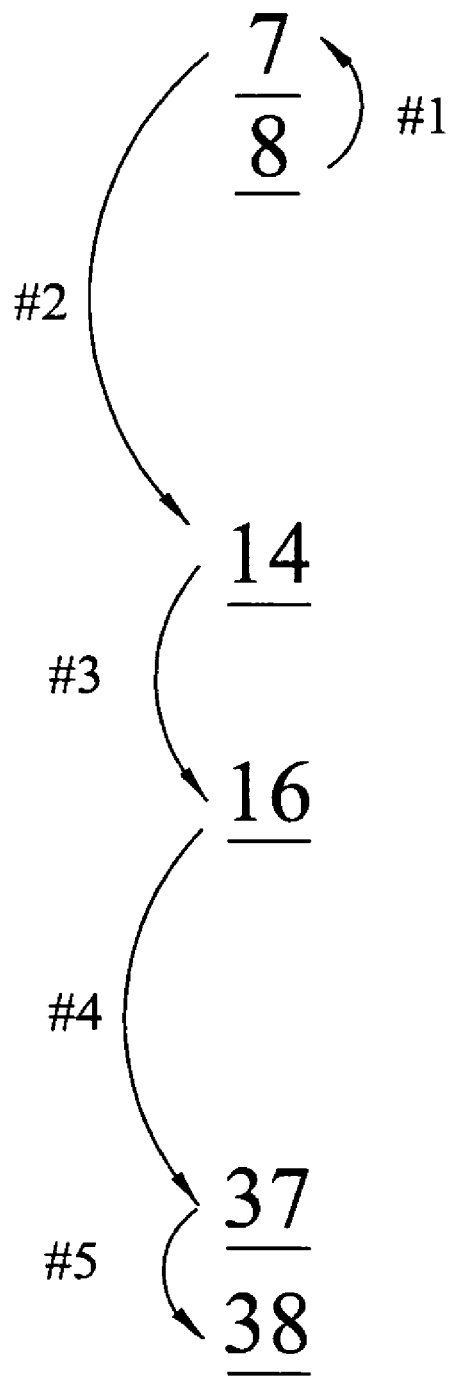
FIG. 2A illustrates data flow security operations to track taint propagation through an exemplary common code format utilized in accordance with an embodiment of the invention.

Data flow analysis is then performed by first identifying program locations where input is taken from the outside world. In this case, user input only arrives in one program location, the statement String acctNumber=request.getParameter("acct"). Starting from the set of input entry points, the input is traced through the assignments, function calls, and operations performed by the program. This process is sometimes referred to as "taint propagation." FIG. 2A illustrates the taint propagation path for this example. In FIG. 2A, underlined numbers correspond to the line numbers of the NST code listed above. The numbered arrows show the sequential taint propagation through the NST code. In this example, the dataflow analyzer uses its library of secure coding rules to determine that input arrives in the program with the call to javax_servlet_ServletRequest_getParameter_L-javax_servlet_ServletRequestLja va_lang_String on line 8 and that the return value of the function contains the input value. It therefore treats the return value of the call as potentially tainted. It next considers the variable assignment on line 7, and the semantics of the NST format are the same as for many standard programming languages like C and Java, so the dataflow analyzer propagates the taint to the left side of the assignment statement on line 7, as illustrated by arrow #1. The variable acctNumber is now tainted. The dataflow analyzer next propagates the taint to locations in the program where the tainted variable acctNumber is used subsequent to the assignment. In this example, acctNumber is only used in one place subsequent to the assignment, on line 7, as illustrated by arrow #2. Due to another secure coding rule, the dataflow analyzer propagates the taint from the third function argument (acctName) to the first function argument (stmt) on line 14, as shown by arrow #3. The dataflow analyzer now considers all uses of the variable stmt subsequent to the propagation of taint from acctName to stmt. One such use of stmt takes place on line 16, where the execute method is called with stmt passed as an argument. Because the system model takes into account the relationship between the database and the application code, the call graph includes a link from the execute call to the get_balance function. This allows the dataflow analyzer to propagate taint from the call to execute to the first and only argument of the get_balance function, NAME, as shown by arrow #4. Again applying knowledge about assignments, the dataflow analyzer uses the fact that NAME is tainted to propagate taint to the left side of the assignment on line 37, and N1 becomes tainted as shown by arrow #5. The dataflow analyzer then considers all uses of N1 subsequent to the assignment. Because N1 is part of an argument passed to the SELECT function on line 38, and because the dataflow analyzer has been provided with a secure coding rule that says that it is a security violation for a tainted value to appear as an argument to the SELECT function, the dataflow analyzer now reports a potential security violation.

If user input can be propagated to a function that has been designated as dangerous, then a vulnerability has been found, and the static analysis engine reports the vulnerability to the user. Observe that the static analysis engine 124 is relying upon one or more security development rules 123 to identify the vulnerability. In this example, the SQL select function is designated as dangerous by a security development rule, so the static analysis engine will report a vulnerability when it determines that user input can reach the SQL select invocation defined in the PL/SQL function. In particular, in this example, the output would contain at least the following information:

Vulnerability found: SQL Injection
Entry point: AccountView.doPost: request.getParameter
Flows to: AccountView.doPost: stmt.execute
Flows to: ACCOUNT.get_balance
Flows to: ACCOUNT.get_balance: SELECT The output may also contain a detailed description of the class of vulnerability found, suggestions for how the problem may be addressed, and references for further reading. The security development module can work inter-procedurally: it can trace user input from a function call through to the implementation of a function. Because all functions are represented in the common NST form, this means that the static analysis engine of the security development module is also operating across languages and across application tiers.

Observe that the security development module facilitates the detection of specific security-related vulnerabilities in source or executable code. In particular, it accomplishes this function across platforms and across different computer languages. Thus, the invention provides global semantic analysis. The invention provides an end-to-end solution, as shown with the foregoing example, which spanned a web form to a database.

The invention identifies a variety of vulnerabilities, including C-buffer overflows, C/Java tainted input, C/Java dynamic SQL, and ordinal problems. Preferably, the security development rules include rules for tracking dangerous data transformations, for performing data processing endpoint analyses, and for probing potential data processing endpoints. Preferably, the security development module is configured to identify taint propagation problems, such as stack buffer overflows, heap buffer overflows, format string attacks, SQL injection, and known problems in popular libraries and third-party software. Further, the security development module is configured to identify ordering constraints issues, such as ordering problems (e.g., race conditions, proper access control/authentication), suspicious code, misuse of common cryptographic protocols, non-cryptographic random number generators and bad seed usage. Preferably, the security development module also supports complexity metrics for architecture analysis and semantic pattern matching. Embodiments of the invention support processing of the following languages: C; C++; Java, including JARs/classes (bytecode analysis), Java frameworks, such as JSP, J2EE/EJB, Struts, and Tapestry. Embodiments of the invention also support PHP, Perl, Python, DLLs, Unix Libraries, Object code and assembly code. Output from the security development module may be in a generic XML format.

The foregoing example relates to a static data flow analysis technique. Those skilled in the art will appreciate that other static analysis techniques may be used in accordance with the invention. For example, a lexical analysis technique may be used. Lexical analysis techniques involve considering only the tokens that comprise the program. An example of a lexical analysis technique that may be used in accordance with the invention is to identify locations where the program invokes dangerous or deprecated functions by recognizing the names of the functions in the token stream. Semantic analysis techniques may also be used. Semantic analysis techniques are built upon an understanding of the semantics of the programming language. An example of a semantic analysis technique that may be used in accordance with the invention is the identification of locations where the program invokes object member functions that are derived from dangerous or deprecated functions by understanding the type of the object, the inheritance hierarchy for the object, and the dangerous or deprecated method in the object's inheritance hierarchy. In addition, program control flow analyses may be used with the invention. Program control flow analyses involve evaluating potential control flow paths in an application that may be executed and searching for paths that could represent security vulnerabilities. An example of a vulnerability that can be identified with control flow analysis is called a TOCTOU (Time of Check to Time of Use) vulnerability. If a program contains a control flow path where it checks a file's permissions and then later on the same control flow path opens the file without any way to verify that the file has not been altered, then it contains a TOCTOU vulnerability. A control flow analysis technique for identifying TOCTOU vulnerabilities first identifies program locations where file permission checks are performed, the technique then follows all potential control flow paths forward from those locations to determine whether that same file is later opened.

Now that the security development module 114 is fully described, attention turns to the security test module 116. The security test module 116 includes executable code to dynamically test applications for vulnerabilities, verify the existence of known weaknesses, and automatically generate test cases that work within existing tools. As previously indicated, the security test module 116 may be implemented with an attack manager module 128, an attack database 130, security test rules 131, a fault injection module 132, and a test report generator 134.

Figure 3:
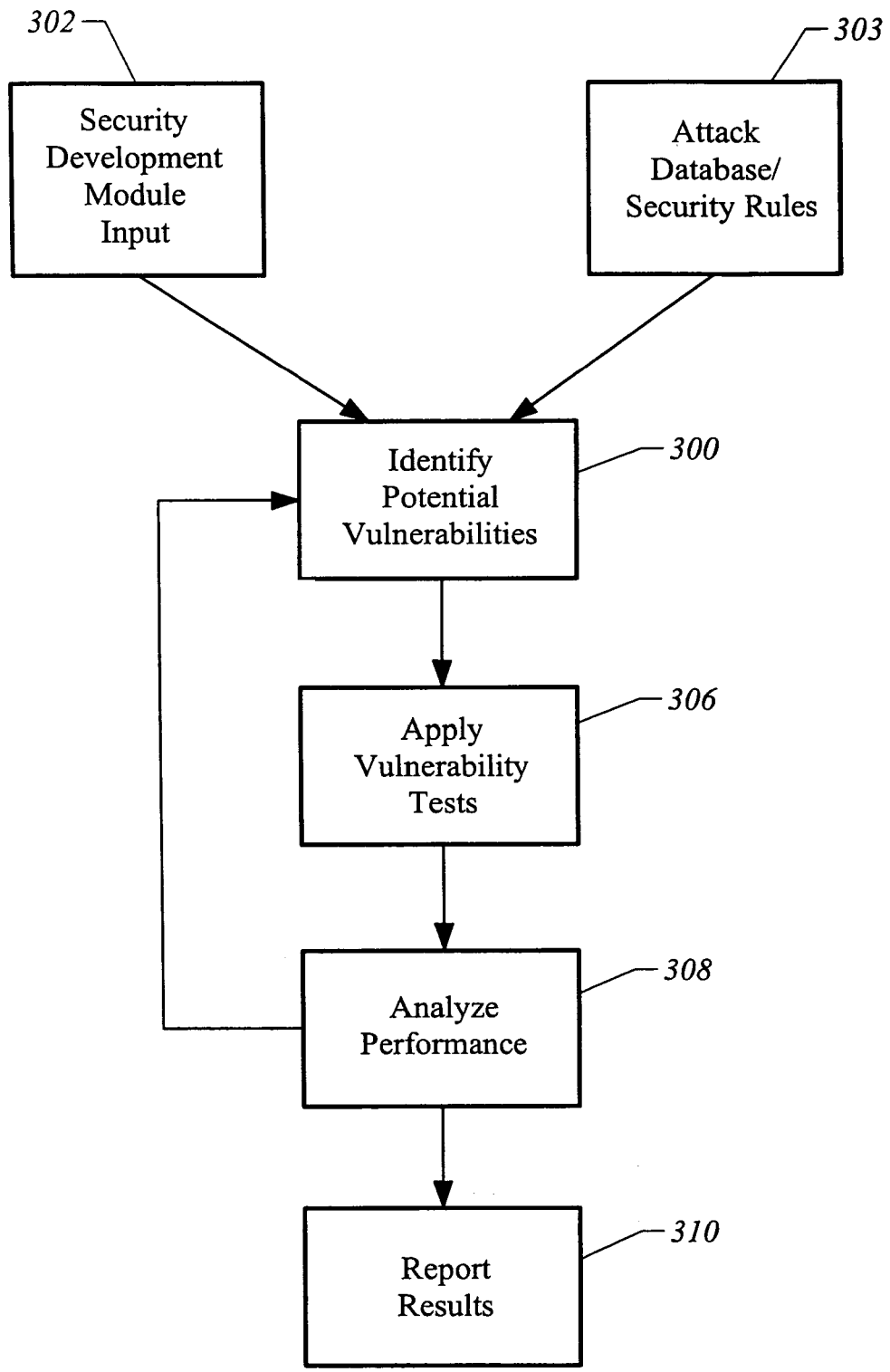
FIG. 3 illustrates processing operations associated with an embodiment of a security test module of the invention.

FIG. 3 illustrates processing operations associated with an embodiment of the security test module 116. An initial operation is to identify potential security vulnerabilities within the source or executable code 300. The attack manager module 128 may be used to perform this operation. In particular, the attack manager module gives users the ability to create and manage attack projects, select analysis modules that suggest attacks, and export attacks to commercially available testing products. As shown in FIG. 3, security development module input 302 and information 303 from the attack database 130 and the security test rules 131 are used to identify potential vulnerabilities. The attack database 130 contains known and user-defined exploits. Preferably, the attack database is regularly updated from a remote computer. In addition, the attack database 130 is preferably customized with specific attacks for an application under test. The security test rules 131 include standard attack rules and user-defined attack rules customized for particular applications. The security test rules 131 may also be periodically updated from a remote computer.

The potential vulnerabilities identified by the attack manager module 128 are processed by a fault injection module 132 to apply vulnerability tests to the software (operation 306 of FIG. 3). The fault injection module 132 includes fault injection executable code to systematically test vulnerable parts of the code against known and custom attacks. For example, the fault injection module 132 applies exploits against input fields, cookies, headers, and the like. The performance of the code under these circumstances is then analyzed (operation 308 of FIG. 3). The fault injection module 132 may be used to perform this analysis. Finally, the results are reported to the user (operation 310). The executable code of the test report generator 134 may be used for this reporting function. The results may also be delivered to the attack manager 128 to identify additional vulnerabilities (operation 300 of FIG. 3). The operation of reporting results 310 may also include reporting performance results as a script to be executed by a test application.

Attention now turns to the security monitoring module 118 of the invention. The security monitoring module 118 includes a sensor insertion module 136 to insert sensors into selected positions of source or executable code being monitored. The security monitoring module 118 also includes executable code in the form of a monitoring analysis module 138 to analyze data from the sensors in order to detect and respond to fraud and other anomalous behavior. The monitoring analysis module 138 invokes a set of security monitoring rules 137. The security monitoring rules 137 may include standard and user-defined security rules. Preferably, the security monitoring module also includes a monitoring report generator 140.

Figure 4:
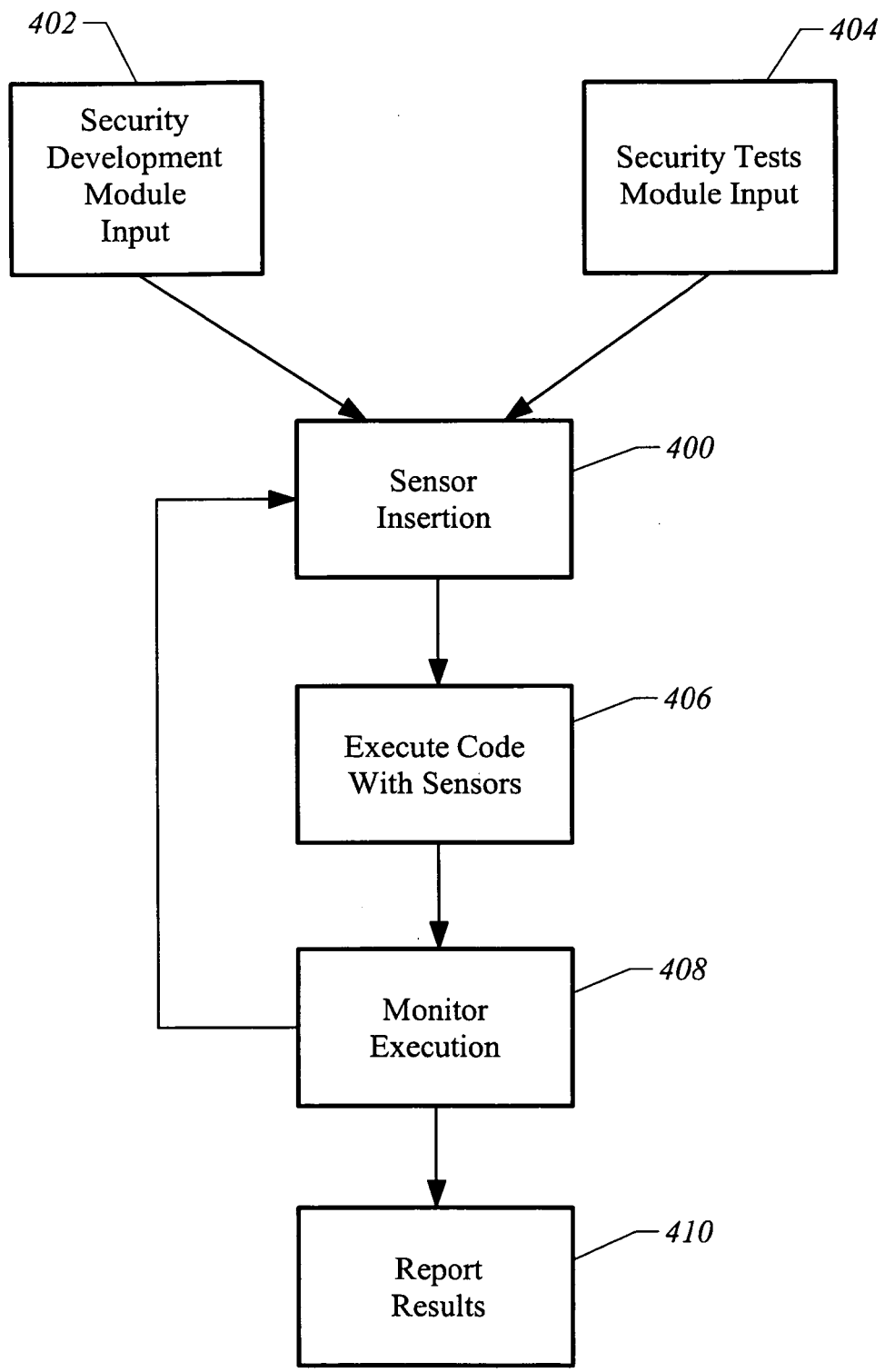
FIG. 4 illustrates processing operations associated with an embodiment of a security monitoring module of the invention.

FIG. 4 illustrates processing operations associated with an embodiment of the security monitoring module 118. Sensors are inserted into source or executable code 400. The sensor insertion module 136 may be used to perform this operation. As shown in FIG. 4, security development module input 402 and security test module input 404 may be used to determine sensor locations within code. Each sensor is executable code to identify and report selected performance criteria associated with the original source or executable code.

The code is then executed with the sensors 406. The sensors generate a stream of security events. The performance of the code is then monitored from a security perspective 408. In particular, a stream of security events from the sensors is processed to detect fraud and misuse. The monitoring analysis module 138 and security monitoring rules 137 may be used to perform this operation. The results may then be reported using the monitoring report generator 140. Alternately or additionally, the results may be fed back to the sensor insertion module 136 to refine the sensor insertion process and to otherwise modify the behavior of the application (operation 400 of FIG. 4).

Figure 5:
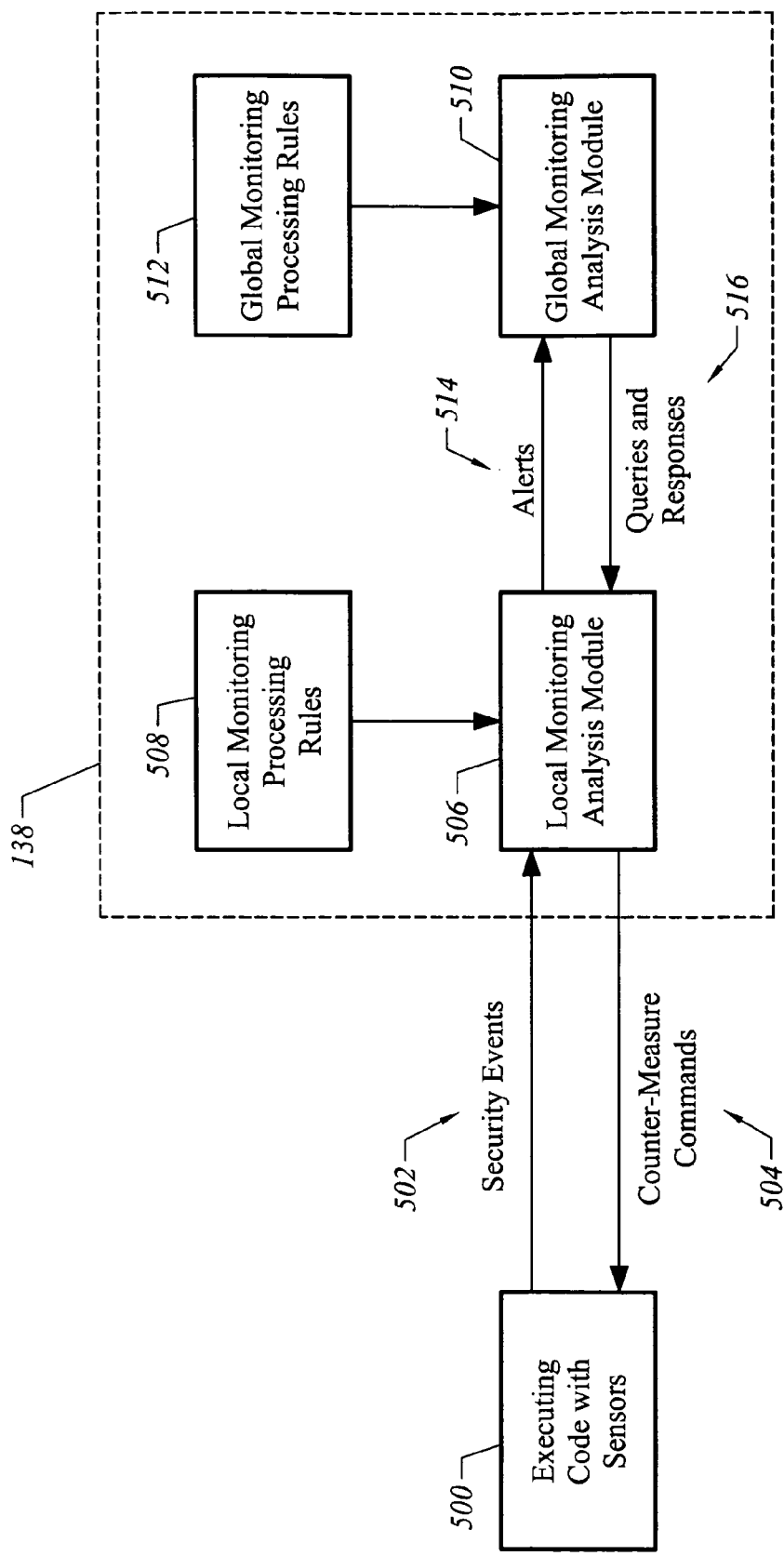
FIG. 5 illustrates the operation of a security monitoring module configured in accordance with an embodiment of the invention.

FIG. 5 illustrates the operation of the security monitoring module 118. In particular, FIG. 5 illustrates a block of executing code with sensors 500. The sensors within the executing code generate security events 502, which are applied to the monitoring analysis module 138. The monitoring analysis module 138 generates counter-measure commands 504. In this embodiment of the monitoring analysis module 138, a local monitoring analysis module 506 relies upon local monitoring processing rules 508 to process the security events 502. The local monitoring processing rules 508 define a set of executable rules that govern appropriate behavior for the executing application. A global monitoring analysis module 510, which relies upon global monitoring processing rules 512 may also be used. The global monitoring processing rules define a set of executable rules that govern appropriate behavior for a set of executing applications. Thus, for example, security vulnerabilities identified in related programs or operations are identified, this information is used to assess whether similar problems are occurring during the execution of a local program. Thus, the security monitoring module 118 may be implemented to rely upon a large set of behaviors and circumstances. Alerts 514 may be exchanged between the local monitoring analysis module 506 and the global monitoring analysis module 510. In addition, queries and responses 516 may be exchanged between these modules.

The sensor insertion module 136 considers a variety of criteria. For example, the sensor insertion module has executable code to determine the types of attacks that the application might be susceptible to based on the source or executable code and the libraries being used. Cross-tier analysis may be used to identify particular functions, modules, or program regions that should be protected. For example, a password maybe traced from HTML/JSP through configuration to a login code written in Java. Data flow analysis may also be used to trace where user input might possibly appear in a program. Sensors are preferably added at the points where user input becomes trusted data. Control flow analysis may be used to avoid instrumenting paths that cannot be executed. User input may also be used to guide the instrumentation process. For example, a user may provide lists of variables that are in scope, a user may provide type checking as a user creates a sensor, or a user may give a list of methods that may be relevant to a particular aspect of the program.

The security monitoring module 118 collects and reports information on a wide variety of software security-related information, including configuration files, introspection, statistical analysis, and information from the security development module 114 and security test module 116 to determine the best points to instrument the code and the most appropriate types of analysis to be performed. The security monitoring module 118 employs a variety of detection mechanisms at many levels. In one embodiment, the security monitoring module 118 uses signature, pattern matching and statistical analysis.

The security monitoring module 118 is utilized because not all security vulnerabilities can be eliminated before an application is deployed. It is particularly difficult to foresee all of the ways in which a piece of software may be abused or used fraudulently over time. Additionally, the code required to detect and respond to misuse is often complex and only tangentially related to the function of the application. To make matters worse, modern applications are commonly made up of heterogeneous components running across a large number of computers.

The security monitoring module 118 operates by overlaying dynamic security behaviors on top of existing programs. The technology provides a mechanism for responding in real time to both attacks and misuse. The approach is based on the combination of aspect-oriented programming, runtime instrumentation, real-time event correlation, and application-based intrusion detection.

Traditional intrusion detection systems operate on either network traffic or on log files and other artifacts that applications leave behind. If network traffic is encrypted, then network-based intrusion detection cannot analyze the contents. Even when operating on unencrypted data, it is up to the intrusion detection system to interpret the contents of a network packet or log file entry. In most cases this means that traditional intrusion detection systems are reduced to analyzing events after the fact and with no visibility into the inner workings of the application. The result is a high number of false alarms and notification about real attacks only after damage has been done. Worst of all, the lack of visibility into the application severely limits the types of attacks or misuse that can be detected.

The security monitoring module 118 overcomes these limitations by providing a framework for adding defensive behaviors to an application at runtime. A security developer can examine the values of internal program variables, execution paths, and performance characteristics while the program is running. Security-relevant events can be analyzed out of band or in line with the program control flow as dictated by security and performance requirements. Events from multiple machines can be correlated in order to provide a broad picture of the state of the system.

The security monitoring module 118 employs a variety of detection mechanisms at many levels. The module synthesizes the varied techniques used in network and host-based Intrusion Detection Systems (IDSs) today—namely signature and pattern matching and statistical analysis—as well as employing a new set of mechanisms appropriate for application level detection. In contrast to existing IDSs, the security monitoring module 118 is most concerned with misuse. Although the security monitoring module 118 employs measures to keep unauthorized users out, one of its most powerful features is the detection of misuse by authorized users. This is in contrast to existing technologies (e.g., application firewalls and database IDSs), which are almost powerless against misuse by unauthorized users.

Detection of attacks by the security monitoring module 118 transpires at many different levels. Some attacks are obvious at a low level, from a simple analysis of a single event. Other attacks require stateful analyses; correlation of events disparate in time and location and therefore detection makes significant demands on system resources. Since detection will not always coincide with the attack, a variety of response mechanisms must be employed. The security monitoring module responds instantaneously in some circumstances, enacts a deferred response in others, and provides a mechanism by which a human operator can both enact and revoke responses.

The security monitoring module 118 is implemented to track its environment and to be as self configuring as possible. Thus, for example, the security monitoring module 118 takes advantage of whatever information is available to it (e.g., configuration files, introspection, statistical analysis, information from the security development module and the security test module, assumptions that can be derived from the architecture) to determine the best points to instrument the code and the most appropriate types of analysis to be performed. Concomitant to contextual awareness, the security monitoring module 118 is preferably configured for flexibility and extensibility. If the security monitoring module administrator is aware of any weak or important nexus in the application, configurable instructions are available to address the issue.

Figure 6:
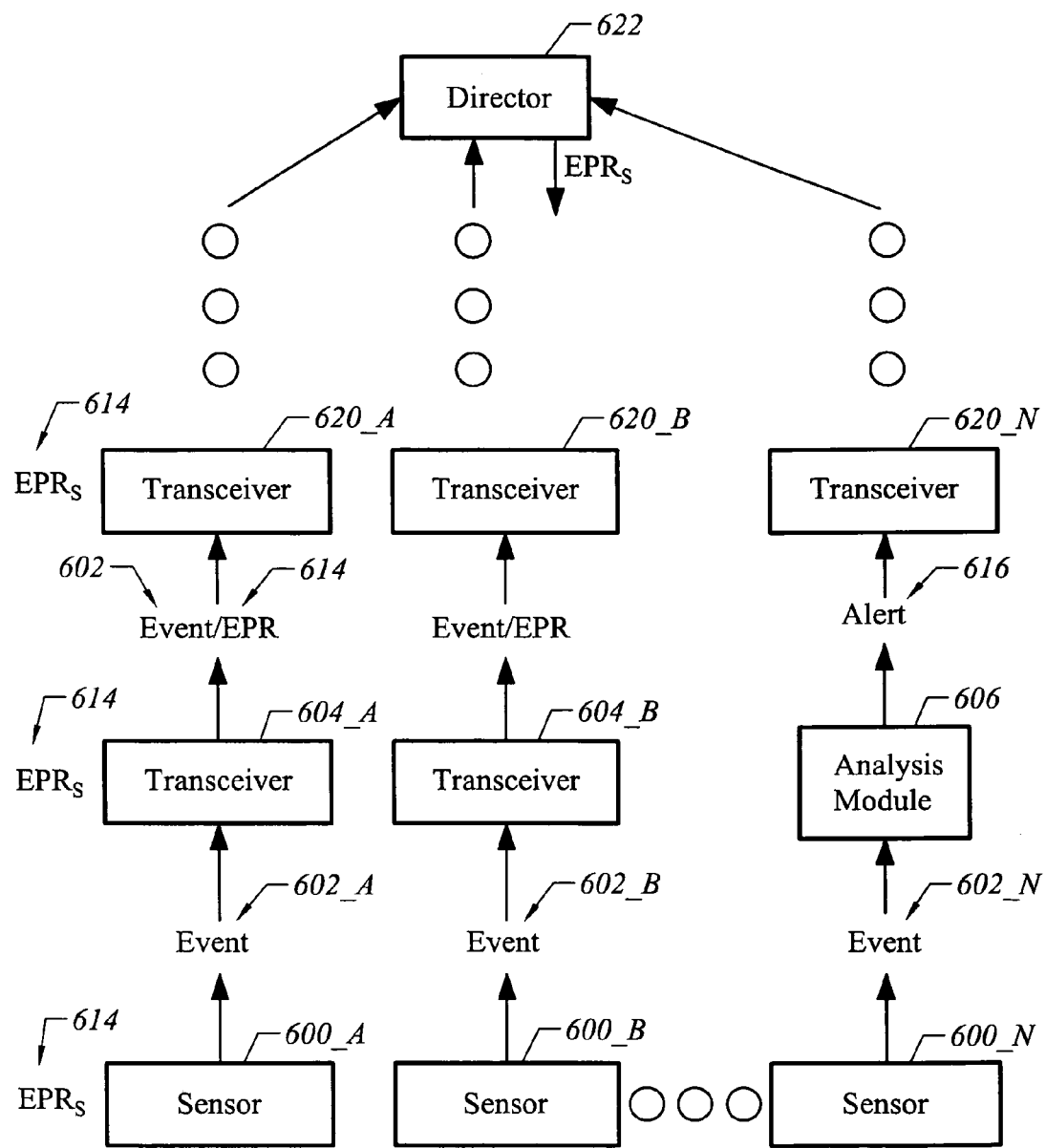
FIG. 6 illustrates components of a security monitoring module configured in accordance with an embodiment of the invention.

The foregoing characterization of the security monitoring module 118 is more fully appreciated in connection with some examples of specific operations performed by the security monitoring module 118. These examples necessitate the introduction of some additional concepts. FIG. 6 illustrates executable code components that may be used to implement the security monitoring module 118. The figure illustrates a set of sensors 600_A through 600_N. The sensors generator events 602_A through 602_N. By way of example, some events are passed to transceivers (e.g., transceivers 604_A and 604_B), while others are passed to analysis modules (e.g., 606). The transceivers 604 generate messages, events 602 or event processing rules (EPRs) 614, as will be discussed below. The analysis module 606 generates an alert 616. Additional hierarchies of transceivers 620_A through 620_N are used to process this information. Eventually, the transceivers report to a director or parent transceiver 622. The director 622 passes EPRs 614 down the transceiver hierarchy. EPRs 614 are also used to control transceivers (e.g., 604, 620), sensors (e.g., 600), and analysis modules (e.g., 606). These operations are more fully appreciated through the following discussion.

A message is a generic container for data passed between transceivers. A message contains data and/or instructions. For example, messages deliver event processing rules (EPRs) down and up a transceiver hierarchy.

An additional concept is that of an event 602. An event 602 is the fundamental unit of data. An event originates in a sensor 600 and is identified by: time, type (generic type of event—i.e. login, database query, database update, etc), source (name of sensor from which it was generated), and context (name of application and server). An event encapsulates information recorded by the sensor (e.g., function parameters, user, session information, stack trace, exceptions thrown, and the like). An alert 616 is a special type of event, which is generated by an analysis module 606 in response to an event from a sensor.

An event processing rule (EPR) 614 provides direction to a transceiver on how to handle an event. EPRs are originated one of three ways: as part of the startup configuration, dynamically at runtime by an administrator via the management console, or dynamically in response to something (normally due to detection or suspicion of intrusion, but can also be used to adjust processing load on various transceivers under heavy load). In one embodiment of the invention, EPRs have the following capabilities: examine the contents of events, modify the contents of events, direct a transceiver to discard an event (filtering), expire after a set period of time, instantiate and parameterize analysis modules, direct events to analysis modules, direct responses from analysis modules, access state stored in the transceiver, enable or disable a sensor, direct a sensor to behave synchronously, designate a single or set of transceivers to which they should be applied, and/or evaluate regular expressions EPRs can be written by system users, be developed with automated tools or can be synthesized by system components in response to an event. EPRs typically have a human-readable format but also support runtime representations that result in efficient interpretation.

Another concept associated with the security monitoring module 118 is that of a transceiver 604. Transceivers 604 are arranged in a hierarchy and are responsible for transmitting events and EPRs. Sensors are a special class of transceiver (they generate events) and the director 622 is also a special type of transceiver. The hierarchy of transceivers is distributed across many systems, potentially across different processes on the same system, and across many threads within a single application. The transceiver hierarchy facilitates the distribution of the intensive workload that intrusion detection demands. Transceivers can filter, correlate and perform processing on events.

A typical transceiver hierarchy includes many levels of transceivers. Sensors collect actual data, and pass it up to an application-level transceiver. If there are multiple applications running on a single machine, there may also be a machine-level or virtual machine-level transceiver. The application level transceiver is responsible for any IPC necessary to transmit messages to a higher-level transceiver on the machine. The highest-level transceivers are responsible for transmitting messages over the network to the director or parent transceiver. Additional transceiver levels may be added below the director in order to push down processing loads, to enable faster event correlation, or to increase filtering capabilities below the director.

EPRs direct the behavior of the transceiver. EPRs are passed down from parent transceivers to children. For intermediate transceivers EPRs can be used to implement filtering or to enable or disable certain types of analysis. For sensors, EPRs provide a way to dynamically change the behavior of the application (e.g., throw an exception if an unauthorized user tries to log in).

Analysis modules 606 can be plugged in to any transceiver 604. The majority of the modules will be run from the director, but it may be desirable to run some of the simpler, stateless modules at lower levels in the hierarchy. Modules could be run on an event before or after it is passed up the transceiver chain, a decision that could be determined by EPRs.

Sensors 600 are another component used with the security monitoring module 118 of the invention. Sensors are a special class of transceivers; sensors generate events. As previously discussed, sensors are embedded in the application at runtime. Because they are embedded in the code, they must be lightweight and fault-tolerant. Sensors should have a minimal impact on application performance. A malfunctioning sensor should not cause the application to break. The normal operation for a sensor is to package whatever contextual data is relevant into an event, check its EPRs against the event for a match, and hand off the event to its parent transceiver.

The security monitoring module 118 also works with a director 622. The director is the top-level transceiver (the destination for all events). Most analysis modules are run at the director level. The director is responsible for logging and maintaining a shared state accessible by the analysis modules and reporting alerts.

The analysis modules are configurable units that perform distinct types of analyses on incoming events. A variety of different analysis modules are employed by default in order to detect as many types of intrusion as possible. Preferably, the analysis modules have an associated application program interface (API) to facilitate the writing of custom detection mechanisms. In one embodiment of the invention, analysis modules include rule-based analyses (logical tests, thresholds and pattern matching) and statistical analyses. When an event triggers an analysis module, it generates an alert and hands it off to its containing transceiver. Depending on the severity level of the alert, the module may also generate an EPR, which will be propagated down the transceiver hierarchy.

In one embodiment of the invention, an analysis module exports a simple interface to an EPR 614. An EPR provides a set of configuration parameters at initialization and as each event occurs. Analysis modules themselves can be very simple or very complex underneath. While some make use of a predefined set of parameters to perform analyses, others are adaptive, learning about applications as they are used and reacting to events that stand out against learned statistical patterns. In order to make analysis modules more flexible and reusable, one analysis module is permitted to instantiate and invoke another (for instance, a module which learns a range of valid values for user input can make use of a range checking module to do actual validation). By way of example, analysis modules may include: a value threshold checker, an event frequency threshold checker, set comparisons, a regular expression checker, stateful pattern matching, statistical moment analyses, and a Markov model analyses (i.e., probability of state transitions).

Relying upon the foregoing concepts, a number of examples of the operation of the security monitoring module 118 will be presented. Suppose that "Joe" normally logs into his system during the day. One day he logs in at 3:00 AM. In this situation, the security monitoring module 118 logs this event and pays close attention to all operations performed by Joe. Next, Joe tries to make a very large transaction to an offshore account. Since he normally makes only small transactions between domestic accounts, the security monitoring module 118 locks him out temporarily and notifies the administrator.

Another example is where "Fred" calls into a function with a 10-character string as the parameter. Previously this function was always called with a 4-character string. In this case, the security monitoring module 118 does not block the transaction, but makes a note of it in a log as suspicious activity. The security monitoring module 118 may also send an email to an administrator.

Another example is where a database transaction is initiated. In this case, all the parameters look normal, but the stack trace is unusual. Therefore, an alert is generated. Still another example is where a particular doctor always logs in from a specific IP address. One day he logs in from an IP address somewhere in Eastern Europe. In this case, the security monitoring module 118 recognizes that the user might be traveling or maybe someone has stolen the password. Thus, an alert is generated.

Consider this final example. Sally Hacker logs into a medical record site and explores the site for holes. She finds a way to manually edit the record id number on the request to the view record page, causing the application to retrieve arbitrary records from the database. Sally then writes a 2-line PERL script to retrieve all the records in the database. In particular, Sally's script makes an HTTP request for /viewrecordjsp?id=1001. A sensor in the servlet engine (ServletSensor) generates an event, which is passed up through the transceiver hierarchy to the director. The event passes through a series of EPRs in the director. One EPR directs the event to an analysis module for frequency threshold detection. The following is exemplary code to implement this operation:

```
************************************************************
    <epr name="TooFast">
        <host>Director</host>
        <module type="RateThreshold" name="rt">
            <param name="rate">1</param>
            <!-- Trigger at 1/s -->
            <param name="history">5</param>
            <!-- Remember 5 requests, need 5 to trigger -->
        </module>
        <clause>
            <condition>
                <equals field="event.sensor" value="ServletSensor" />
            </condition>
            <action>
                <analyze module="rt" />
            </action>
        </clause>
    </epr>
************************************************************
```

Seconds later Sally's script makes a 5$^{th}$ request (/viewrecordjsp?id=1005) and the ServletSensor generates an event. In the director, TooFast directs the event to its "rt" module, which is triggered by the high rate of page requests. The analysis module generates an EPR and sends it down the transceiver hierarchy. The following code may be used to implemented these operations:

```
*************************************************************
    <epr name="IntrustionResponse.1">
        <expires> Wed Nov 27 14:30:15 PDT 2004</expires>
        <host>ServletSensor</host>
        <clause>
            <condition>
                <or>
                    <equals field="event.username" value="sally.hacker"/>
                    <equals field="event.remoteaddr" value="136.205.62.161"/>
                </or>
            <condition>
            <action>
                <exception message="Account Blocked" />
            </action>
        </clause>
    </epr>
*************************************************************
```

The EPR reaches the ServletSensor and is added to its chain of EPRs. Back in the director, the analysis module generates an alert, which is sent to the management console. Sally's script requests /viewrecordjsp?id=1005. In the ServletSensor, the InstrustionResponse 1 EPR detects the event and instructs the sensor to throw an exception, blocking the page request.

Shortly, a system administrator notices a high-priority alert in the management console. The administrator examines the requests made by Sally's script, and notices that all 5 requests returned the records of other patients. The administrator must now quickly patch this hole in the system: blocking Sally's IP address and account will not keep Sally or other hackers out for long. A small team is quickly assembled, including the application developer and the security monitoring module administrator. They write a set of EPRs to address the problem until a patch can be developed, tested and deployed. One EPR (A) will monitor events from several sensors, including the sensor that monitors the EJB container's JDBC requests. The EPR runs in the application level transceiver so that it has access to events from all the sensors it needs. A second EPR (B) activates an analysis module in this transceiver, which performs event correlation, linking together multiple events from a single user transaction. Finally, an EPR(C) is written for the EJB container's sensor, which instructs it to wait for a response from the application transceiver before proceeding. A malicious request to the view record page now initiates the following sequence.

A sensor at the application entry point generates an event indicating the start of a user transaction. In the application transceiver, EPR (B) directs this event to the correlation modules, which starts a new event series.

A sensor in the application generates a request event, which contains the session id, user account, request path and miscellaneous parameters. In the application transceiver, this event is correlated with the first event. A sensor in the EJB container generates an event which has information on the record returned by the JDBC request. EPR (C) instructs the sensor to wait for a response from the application transceiver before continuing. At the application transceiver, the event is correlated with the other events from this transaction. Then EPR (A) checks to make sure the userid from the record returned (event 3) matches the real userid (event 2). If everything is OK, it instructs the waiting sensor to continue. If the userids do not match, it instructs the waiting sensor to throw an exception, and generates an alert.

In one embodiment of the invention, the security monitoring module 114 includes security monitoring rules 137 that monitor a user's online behavior. The user's online behavior at any given instance is compared to rules characterizing the user's previous behavioral trends. If there is a threshold difference in these two behaviors, then enhanced security is invoked. For example, a user's behavior may be monitored with respect to the user's browser, the time of day the user is working, the user's flow through the application, and the like. If the behavior at a given time is inconsistent with previous behavioral trends, then a security event, such as a challenge response sequence is invoked.

Those skilled in the art will identify a number of advantages associated with the security monitoring module 118 of the invention. The security monitoring module 118 facilitates overlaying dynamic security behaviors on top of existing programs without rewriting programs. The technology provides a mechanism for responding in real time to both attacks and misuse. The approach is based on the combination of aspect-oriented programming, runtime instrumentation, real-time event correlation, and application-based intrusion detection. The invention provides a way to protect a running software program so as to restrict its use to only functionality intended by the developer.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium including stored executable instructions to analyze program instructions for security vulnerabilities, comprising instructions executing to:

convert diverse program instruction formats of a set of software applications executing on different platforms to a common format, wherein said executable instructions to convert include executable instructions to break down expressions of said diverse program instruction formats into a single set of equivalent sequences of simpler statements to support analysis of said diverse program instruction formats;

derive a system model from said common format, wherein said model characterizes program interactions between said diverse program instruction formats;

perform a static analysis on said system model to identify security vulnerabilities, wherein said static analysis includes analyzing said system model without executing said system model; and report said security vulnerabilities.

2. The computer readable medium of claim 1 wherein said executable instructions to convert include executable instructions to convert different source or executable code formats executing on different platforms to said common format.

3. The computer readable medium of claim 1 wherein said executable instructions to convert include executable instructions to convert different machine instruction formats to said common format.

4. The computer readable medium of claim 1 wherein said executable instructions to convert include executable instructions to convert different program configuration file formats to said common format.

5. The computer readable medium of claim 1 wherein said executable instructions to convert include executable instructions to convert a program instruction expression into an equivalent sequence of simpler statements defined in said common format.

6. The computer readable medium of claim 5 wherein said executable instructions to convert include executable instructions to convert said program instruction expression into an equivalent sequence of simpler statements that includes a temporary variable.

7. The computer readable medium of claim 1 wherein said executable instruction to derive include executable instructions to derive a system model characterizing multiple inter-operative applications.

8. The computer readable medium of claim 1 wherein said executable instructions to perform include executable instructions to identify locations where input is taken from outside the program instruction formats.

9. The computer readable medium of claim 8 wherein said executable instructions to perform include executable instructions to trace the processing of said input throughout said diverse program instruction formats.

10. The computer readable medium of claim 1 wherein said executable instructions to perform include executable instructions to identify at least one of the following security vulnerabilities: stack buffer overflow, heap buffer overflow, format string attack, SQL injection, an ordering problem, and protocol misuse.

11. The computer readable medium of claim 1 wherein said executable instructions to perform a static analysis include executable instructions to perform a static analysis selected from a static data flow analysis, a lexical analysis, a semantic analysis, and a program control flow analysis.

12. The computer readable medium of claim 1 wherein said executable instructions to report include executable instructions to report a vulnerability, a vulnerability entry point, and a vulnerability processing path.

13. The computer readable medium of claim 1 wherein said executable instructions to report include executable instructions to report said security vulnerabilities to a security test module and a security monitoring module.

14. A method of analyzing stored program instructions for security vulnerabilities, comprising:

converting diverse program instruction formats of a set of software applications executing on different platforms to a common format, wherein converting includes breaking down expressions of said diverse program instruction formats into a single set of equivalent sequences of simpler statements to support analysis of said diverse program instruction formats;

deriving a system model from said common format, wherein said system model characterizes program interactions between said diverse program instruction formats;

performing a static analysis on said system model to identify security vulnerabilities, wherein said static analysis includes analyzing said system model without executing said system model; and reporting said security vulnerabilities.

15. The method of claim 14 wherein converting includes converting different source or executable code formats executing on different platforms to said common format.

16. The method of claim 14 wherein converting includes converting different machine instruction formats to said common format.

17. The method of claim 14 wherein converting includes converting different program configuration file formats to said common format.

18. The method of claim 14 wherein converting includes converting a program instruction expression into an equivalent sequence of simpler statements defined in said common format.

19. The method of claim 14 wherein deriving includes deriving a system model characterizing multiple inter-operative applications.

20. The method of claim 14 wherein performing a static analysis includes performing a static analysis selected from a static data flow analysis, a lexical analysis, a semantic analysis, and a program control flow analysis.

* * * * *

(12) EX PARTE REEXAMINATION CERTIFICATE (7210th)
United States Patent
Chess et al.

(10) Number: US 7,207,065 C1
(45) Certificate Issued: Dec. 1, 2009

(54) APPARATUS AND METHOD FOR DEVELOPING SECURE SOFTWARE

(75) Inventors: Brian Chess, Mountain View, CA (US); Arthur Do, Danville, CA (US); Sean Fay, San Francisco, CA (US); Roger Thornton, San Jose, CA (US)

(73) Assignee: Fortify Software, Inc., Menlo Park, CA (US)

Reexamination Request:
No. 90/010,050, Nov. 8, 2007

Reexamination Certificate for:
Patent No.: 7,207,065
Issued: Apr. 17, 2007
Appl. No.: 11/010,146
Filed: Dec. 10, 2004

Related U.S. Application Data

(60) Provisional application No. 60/577,066, filed on Jun. 4, 2004.

(51) Int. Cl.
*G06F 11/00* (2006.01)
*H04L 9/32* (2006.01)

(52) U.S. Cl. .................... 726/25; 726/3; 726/22
(58) Field of Classification Search .................. None
See application file for complete search history.

(56) References Cited

U.S. PATENT DOCUMENTS 7,483,972 B2   1/2009   Bhattacharya et al.

OTHER PUBLICATIONS

IEEE Xplore, Citation for Chess, B.V.; "Improving Computer Security Using Extended Static Checking" (2002).*
ACM Portal, Citation for Ken Ashcraft et al., "Using Programmer–Written Compiler Extensions to Catch Security Holes" (2002).*
ACM Portal, Citation for William R. Bush et al., "A Static Analyzer for Finding Dynamic Programming Errors" (2000).*
ACM Portal, Citation for J. Viega et al., "ITS4: A Static Vulnerability Scanner for C and C++ Code" (2000).*
AMC Portal, Citation for Umesh Shankar et al., "Detecting Format String Vulnerabilities with Type Qualifiers", (2001).*
Ashcraft, K., Dawson, E., "*Using Programmer–Written Compiler Extensions To Catch Security Holes.*" IEEE Symposium on Security and Privacy (2002).
Bush, W.R., et al., "*A Static Analyzer For Finding Dynamic Programming Errors*," Software: Practice and Experience, 30(7):775–802 (2000).
Chess, B.V., "*Improving Computer Security Using Extended Static Checking,*" IEEE Symposium on Security and Privacy (May 2002).
Detlefs, et al., "*Extended Static Checking,*" Technical Report 159, Compaq Systems Research Center (1998).
Leino, et al., "*Checking Java Program via Guarded Commands,*" Technical Report 1999–02, Compaq Systems Research Center (May 1999).
Shankar, et al., "*Detecting Format String Vulnerabilities with Type Qualifiers,*" Proceedings of the 10th USENIX Security Symposium (2001).
Viega, J., et al., "*ITS4: A Static Vulnerability Scanner for C and C++ Code.*" Proceedings Of The Annual Computer Security Applications Conference (2000).
Zovi, "*Security Applications of Dynamic Binary Translation, Thesis,*" The University of New Mexico (2002).

* cited by examiner

*Primary Examiner*—Mary Steelman

(57) ABSTRACT

A computer readable medium includes executable instructions to analyze program instructions for security vulnerabilities. The executable instructions convert diverse program instruction formats to a common format. A system model is derived from the common format. A static analysis is performed on the system model to identify security vulnerabilities. Security vulnerabilities are then reported.

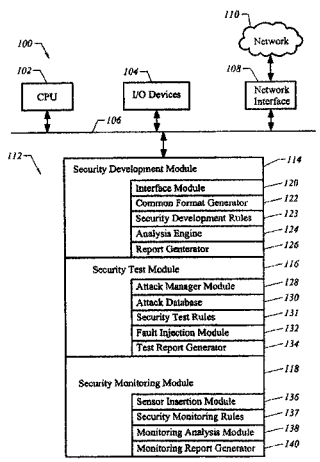

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 14 are determined to be patentable as amended.

Claims 2–12 and 15–20, dependent on an amended claim, are determined to be patentable.

Claim 13 was not reexamined.

1. A computer readable medium including stored executable instructions to analyze program instructions for security vulnerabilities, comprising instructions executing to:
   convert *each of a plurality of* diverse program instruction formats of a set of software applications [executing on different platforms] to a common format, *wherein said set of software applications is located on a plurality of different platforms and said set of software applications form a defined software system,* wherein said executable instructions to convert include executable instructions to break down expressions of said *plurality of* diverse program instruction formats into a single set of equivalent sequences of simpler statements to support analysis of said [diverse program instruction formats] *defined software system, wherein said diverse program instruction formats result in a corresponding set of translations, each in said common format, wherein said set of translations express the functions of said defined software system*;
   derive a *homogeneous software* system model *of the defined software system* from said [common format] *set of translations, wherein said homogeneous software system* model characterizes program interactions between said *plurality of* diverse program instruction formats *located on said plurality of different platforms*;
   perform a static analysis on said *homogeneous software* system model to identify security vulnerabilities, wherein said static analysis includes analyzing said *homogeneous software* system model without executing said system model; and
   report said security vulnerabilities.

14. A method of analyzing stored program instructions for security vulnerabilities, comprising:
   converting *each of a plurality of* diverse program instruction formats of a set of software applications [executing on different platforms] to a common format, *wherein said set of software applications is located on a plurality of different platforms and said set of software applications for a defined software system,* wherein converting includes breaking down expressions of said *plurality of* diverse program instruction formats into a single set of equivalent sequences of simpler statements to support analysis of said [diverse program instruction formats] *defined software system, wherein said diverse program instruction formats result in a corresponding set of translations, each in said common format, wherein said set of translations express the functions of said defined software system*;
   deriving a *homogeneous software* system model *of the defined software system* from said [common format] *set of translations, wherein said homogeneous software* system model characterizes program interactions between said *plurality of* diverse program instruction formats *located on said plurality of different platforms*;
   performing a static analysis on said *homogeneous software* system model to identify security vulnerabilities, wherein said static analysis includes analyzing said *homogeneous software* system model without executing said system model; and
   reporting said security vulnerabilities.

\* \* \* \* \*